Aug. 3, 1943.                G. L. KAYDEN                2,325,683
                    COFFEE ROASTER AND PERCOLATOR
                        Filed June 9, 1939            2 Sheets-Sheet 1
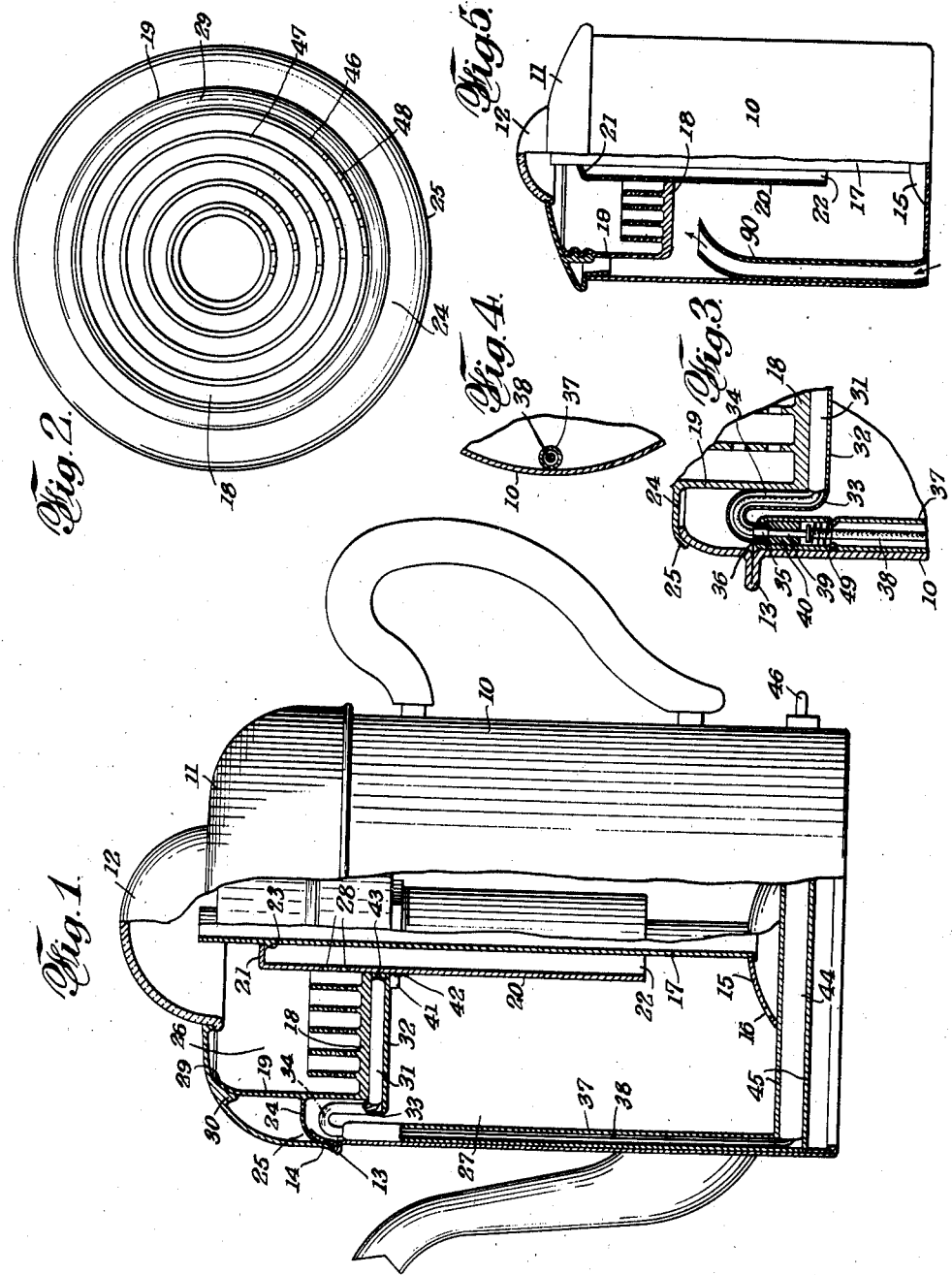
INVENTOR
Gustave L. Kayden
BY
ATTORNEY Aug. 3, 1943.                G. L. KAYDEN                2,325,683
                      COFFEE ROASTER AND PERCOLATOR
                         Filed June 9, 1939            2 Sheets-Sheet 2
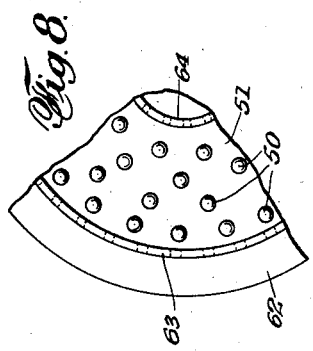
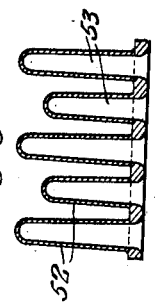
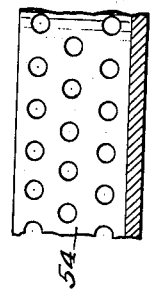
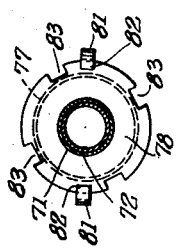
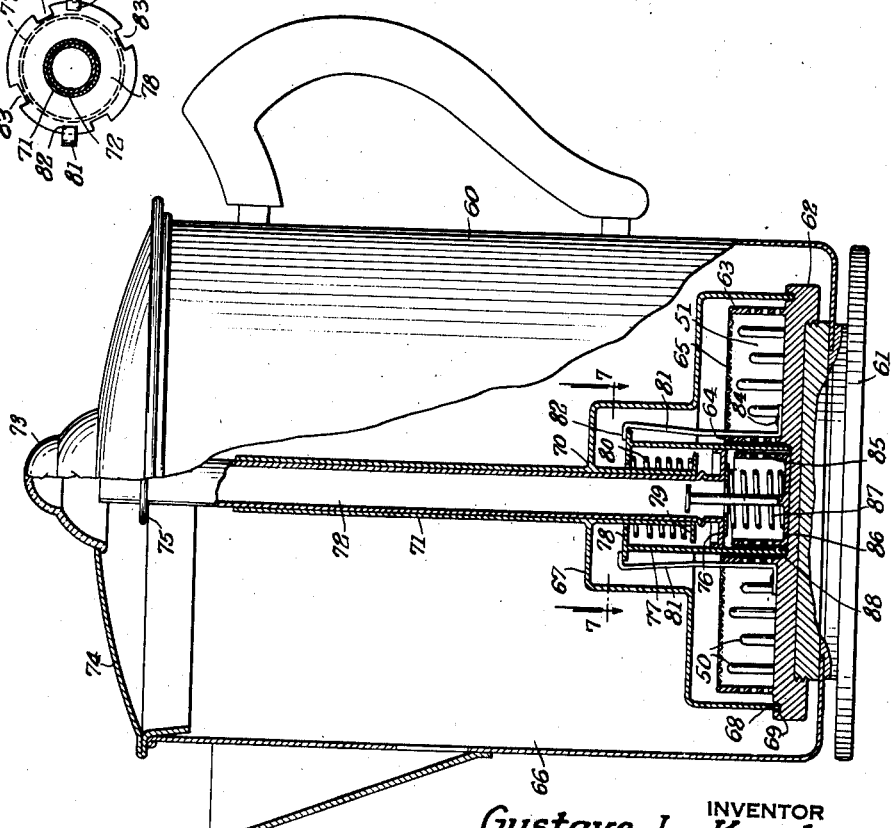
INVENTOR
Gustave L. Kayden
BY
ATTORNEY Patented Aug. 3, 1943

2,325,683

UNITED STATES PATENT OFFICE 2,325,683

COFFEE ROASTER AND PERCOLATOR

Gustave L. Kayden, Woodmere, N. Y.

Application June 9, 1939, Serial No. 278,259

12 Claims. (Cl. 53—3)

This invention relates to combined coffee roasters and percolators and is a modification of the structure disclosed in my copending application Serial No. 253,970, filed February 1, 1939. In said copending application, I have disclosed a coffee roasting apparatus in which the brewing of the coffee takes place in the same compartment in which raw ground coffee is roasted. The roasting compartment, however, is there rotated in order to obtain uniform roasting of the raw ground coffee to the required extent. The rotation of the roasting compartment requires the use of a motor or other apparatus for agitating the coffee during the roasting thereof.

The present invention contemplates the provision of means for roasting the raw ground coffee in such a manner that sufficiently uniform roasting is attained without the necessity for agitation of the coffee or the use of moving apparatus.

This invention further contemplates the provision of coffee holding means for distributing heat throughout the entire mass of the coffee substantially uniformly by providing a comparatively large heating surface designed to contact with most of the particles of coffee or to convey the heat thereto so as to effect substantially uniform roasting.

My invention further contemplates the provision of means for automatically controlling the time during which heat is supplied to the coffee so as to roast the coffee to the desired extent before the coffee is percolated.

My invention further contemplates the provision of thermostatic means for controlling the initiation of the percolating process and for permitting the coffee to be percolated only after the roasting of the coffee has been completed regardless of how long the water used to percolate the coffee has been boiling.

The various objects of the invention will be clear from the description which follows and from the drawings, in which Fig. 1 is a combined front elevation and vertical section of a coffee pot to which my invention has been applied.

Fig. 2 is a top plan view of one form of the roasting cup.

Fig. 3 is an enlarged fragmentary vertical section of the detachable electrical connection for the roaster heater of Fig. 1.

Fig. 4 is a fragmentary horizontal section of the main electrical conduit of Fig. 3.

Fig. 5 is a combined front elevation and vertical section similar to Fig. 1 of a modified form of the invention.

Fig. 6 is a combined elevation and vertical section of a coffee pot to which a modified form of the invention has been applied and showing the thermostatic means for controlling the percolating operation.

Fig. 7 is a horizontal section taken on the line 7—7 of Fig. 6.

Fig. 8 is a fragmentary top plan view of the modified form of the roasting cup shown in Fig. 6.

Fig. 9 is a fragmentary vertical section of another modified form of the roasting cup.

Fig. 10 is a fragmentary vertical section of still another modified form of the roasting cup.

It will be understood that in accordance with my invention, raw coffee beans are first ground. The thus ground raw coffee is supplied to the roasting cup which is of such construction that heat is supplied by conduction, as distinguished from convection, throughout the major part of the mass of the coffee. The heat may be supplied to the roasting cup in any suitable manner, as by a gas or other flame, or by suitable electric heaters, for a sufficient time to roast the coffee and at the same time to heat the water in the coffee pot. Preferably, the roasting operation is completed at about the same time that the water boils. Thereafter, the boiling water is percolated through the thus roasted coffee, and through suitable passages, is conducted back to the boiling water to brew the liquid coffee.

In the practical embodiment of the invention which I have shown by way of example, and referring particularly to Figs. 1, 2 and 3, the coffee pot 10 is provided with a removable cover 11 which carries the centrally arranged transparent member 12, through which the percolating operation may be viewed in the customary manner. The outstanding beaded rim 13 on the pot is engaged by and supports the lower edge 14 of the cover.

Within the coffee pot is removably inserted the coffee brewing and percolating apparatus. The percolator is of the usual type, comprising the base 15 adapted to rest on the bottom of the pot and provided with an opening 16 for the passage of water thereinto, the upright percolator pipe 17 communicating with the interior of the base 15 and extending upwardly to a point adjacent the member 12. The roasting unit is also removable, and in the form being described, comprises the cup 18 having the upwardly extending outermost flange 19 extending to the cover 11. The outer and larger tube 20 passes centrally through the cup 18 and is secured thereto for removal and insertion therewith into the pot as a unit. Said tube 20 surrounds the percolator tube 17 and is closed at its top 21 and open at its bottom 22. Said top 21 may rest on a suitable extension as 23 on the percolator tube 17 whereby the cup and the tube 20 are provided with a central support. To aid in supporting the roasting cup, the horizontal flange 24 extends from the upright flange 19 and is provided with a curved terminal portion 25 adapted to engage and rest on the rim of the pot.

Communication is established between the interior 26 of the roasting compartment and the water compartment 27 through the openings 28 in the tube 20, which openings are small enough to prevent the passage of the ground coffee particles therethrough. It will be understood, however, that sufficient water is normally inserted into the water compartment 27 to seal the opening 22 at the bottom of the tube 20 so that the roasting compartment 26 is provided with a water seal at its bottom. The roasting compartment is sealed at its top by the upper end 29 of the upright flange 19, said end being preferably curved inwardly and engaging a suitable preferably flexible gasket 30 secured to the inside face of the cover 11. Similarly, the percolator tube 17 is normally sealed at its bottom by the water entering the opening 16 and rising within the tube 17 to the level of the water in the water compartment 27.

The sealing of the roasting compartment is an important feature of my invention. By so sealing the compartment during the roasting operation, the volatile materials in the coffee giving the coffee its peculiar aroma and flavor, are sealed and maintained within the roasting compartment and cannot escape to the outside air. When the percolating action begins, the volatile materials can pass through the openings 28 and 22 into the water of the compartment 27 to be absorbed thereby without loss and to impart to the coffee the full flavor so desirable.

It will be understood that any suitable means may be provided for heating the roasting cup 18 and for heating the water in the compartment 27. Said means may consist of a gas or other flame led as by suitable passages to the cup 18, said flame also heating the water in the compartment 27 (Fig. 5). The heating means may otherwise, if desired, consist of any other form of heat-conducting devices operating by conduction or by convection since the particular heating means is not an essential part of my invention.

In the form of heating means shown in Fig. 1, I provide an electric heater 31 including a heating element of the usual type, the heater being provided with a central opening. To hold the heater removably in place, the holding plate 32 is provided, said plate having an inner cylindrical flange 43 loosely engaging the tube 20. Said tube is suitably threaded as at 42 so that the lock nut 41 may be tightened against the plate 32 to press the heater 31 against the bottom of the cup 18 and to eliminate any air space between the heater and the cup. From the plate 32 extends the pipe 33, a similar pipe extending from a diametrically opposed point of the plate. Within the pipe is the wire 34 terminating in the contact element 35 which is carried by the member 36 of suitable insulating material. The pipe 37, secured to the inside wall of the pot 10, is the conduit for current supplied to the wire 34.

Said pipe 37 is open at its upper end, the opening therein being of sufficient diameter to receive the end of the pipe 33 when the roasting unit is arranged in place in the pot. The conducting wire 38 extends through the pipe 37 and is connected to a contact element 39 enclosed in the cylindrical insulating member 40 yieldingly supported by the spring 49.

It will be seen that when the cover 11 is removed, the entire roasting unit may also be removed by lifting the flange 19 so that the cup 18, the tube 20 secured thereto, the plate 32, the heater 31 and the pipes 33 are also removed, thereby breaking the connection between the contact members 35 and 39. The percolator pipe 17 and its base 15 may also be removed, leaving the pot empty, or containing liquid coffee after the percolating operation. After the liquid coffee has been consumed, the pot may then be readily cleaned and when it is to be used again, fresh water may be poured thereinto after which the percolator tube and base are reinserted and the roasting compartment also reinserted, the tube 20 receiving the tube 17, the flange 24 engaging the rim of the pot to support the unit and the contact members 35 and 39 coming into contact to close the circuit to the heater 31.

As illustrated, separate means are provided for heating the water. In the form shown, the heating means comprises the heating element 44 covered by the bottom 45 of the pot and suitably supported. Current is supplied to the heaters 44 and 31 through suitable connections leading to the plug 46 to which current may be supplied in the usual manner.

After the cup and the remainder of the roasting unit and the percolator means have been inserted into place and the circuit thereto completed as above described, water having been supplied to the compartment 27, the raw ground coffee is supplied to the cup 18, whereby the heating of the water and the roasting of the coffee is begun. Said cup may take a variety of different forms but in any case, it is so designed that a comparatively large heating area is provided interiorly of the walls thereof to contact with as many as possible of the particles of raw ground coffee distributed throughout the inside of the cup.

In the form shown in Figs. 1 and 2, a plurality of circular concentric perforated partitions as 46, 47 are arranged in the cup, the perforations 48 of said partitions being sufficiently large to permit the particles of raw coffee to pass into the spaces between the partitions and to level off within the cup. It will be understood, however, that the openings 28 in the tube 20 are either screened or are small enough to prevent the particles of solid coffee from passing therethrough. It will further be seen that when the cover 11 is arranged in place, the roasting compartment is sealed at its top by the cover between the members 29 and 30 and at its bottom by the cup 18, a water seal being maintained at the bottom of the tubes 20 and 17 so that the roasting compartment is completely sealed against loss of any vapors rising by the roasting operation.

Current having been supplied to the plug 46, the circuit to the heaters 44 and 31 is closed and the roasting operation begins at the same time that the heating of the water is commenced. The amount of water and the amount of coffee, as determined by the capacity of the pot and the capacity of the cup 18, are such that the water in the water compartment begins to boil at about the same time that the roasting of the coffee in the cup has been completed. On completion of the roasting operation and the boiling of the water, boiling water passes upwardly through the pipe 17 and emerges at the upper end thereof striking against the transparent member 12 and dropping into the cup and circulating through the ground coffee therein to brew liquid coffee. The brew returns through the openings 28 and passes downwardly through the tube 20 into the water compartment, mingling with the water therein to complete the brewing of the coffee. The thus brewed coffee may be poured while retaining the roasting compartment in the pot or, if desired, the entire roasting compartment may be removed by first removing the cover 11 and then lifting the entire roasting unit out of the pot after which the cover 11 is replaced.

In that form of the cup shown in Fig. 8, the partitions 46 and 47 are replaced by a plurality of substantially closely spaced solid cylindrical metallic members or posts 50 of such height and diameter that a large heating surface is provided contacting with a considerable number of the particles of coffee inserted into the cup 51.

In the form of the cup shown in Fig. 9, a similar large number of cylindrical uprights or posts as 52 are provided, said uprights, however, being as 52 are hollow to provide in each thereof a space 53 in which heated air may be trapped and superheated by whatever heating means is used for heating the cup.

In Fig. 10, I have shown a perforated or foraminated member as 54 to replace the concentric partitions 47 of the cup, said member 54 taking the form of a screen or the like in which the openings are of sufficient size to distribute the ground coffee evenly throughout the cup. Where the screen 54 is of considerable length, it may be attached at its bottom edge to the cup bottom in spiral form, or it may be made in the form of spaced concentric circles, similar to the concentric form of the partitions 46 and 47.

Referring now to Figs. 6 and 7, I have there shown a modified form of my invention wherein thermostatic means is used to control the time of the roasting operation, and to control the initiation of the percolating operation. While in this form of the invention, the means for heating the raw ground coffee to roast it is also used for boiling the water, it will be understood that the roasting cup together with its thermostat may be arranged in the manner shown in Fig. 1 at the upper part of the pot instead of the lower part and may be provided with a separate heating means or with means for conducting heat from a flame to the roasting cup, in a manner which will now be readily understood and hence needs no further description nor illustration. As shown, however, the pot 60 is provided with a base 61, which is intended to designate either an electric heater, or a plate adapted to conduct heat from an extraneous source of heat such as a gas flame or the like, or any other source of heat such as a hot plate otherwise heated. The roasting cup 51 comprises the base or bottom wall 62, the outer slitted or perforated cylindrical wall 63 and the solid posts 50, the latter constituting heat-distributing elements conducting heat from the base or bottom wall 62 and heating the adjacent particles of ground coffee inserted into the cup, as has been hereinbefore explained. The posts 50 extend into the interior of the cup to a sufficient extent to contact with as many as possible of the particles of ground coffee. The inner cylindrical wall 64 of the cup is also slitted or perforated so that water entering the cup may be discharged through the wall 64 in a manner soon to be described. To prevent coffee grounds from floating out of the cup, the top may be covered by a screen as 65, removably secured to the wall 63.

For normally preventing water in the water compartment 66 from entering the cup during the roasting operation, the cup cover 67 is provided, said cover being open at its bottom edge 68, said bottom edge entering the groove 69 in the base 62 of the cup and thereby normally sealing the cup. At its upper edge 70, the cover is secured to the tube 71 which is mounted for sliding movement on the percolator tube 72. At its upper end, said percolator tube is spaced somewhat below the transparent member 73 of the coffee pot cover 74, and also carries a stop member 75 for limiting the upward movement of the tube 71 relatively to the percolator tube 72, and serving also as a finger grip for rotating the tube 72 when desired.

At its lower end, said percolator tube is provided with the horizontal flange 76 which is secured to the imperforate cylindrical member 77 provided with a projecting horizontal top 78, which top has a plurality of spaced slots or openings 83 in the edge thereof (Fig. 7). The tube 71 extends past the point 70, where it is secured to the cover, into the interior of the cover and terminates in a horizontal flange 79 on which rests one end of the spring 80, the other end of which abuts against the lower face of the top 78 of the cylindrical member 77. Said spring 80 urges the members 77 and 78 upwardly relatively to the tube 71 and to the cover 67.

Thermostatic or heat responsive means are provided, however, for normally preventing said members from moving under the action of the spring. Said heat responsive means comprises a pair of diametrically opposed elongated bimetallic hooks 81, the upper bent ends 82 of which engage said top 78. In order that said top may be inserted under the ends 82 of the hooks, the pipe 72 is lowered manually carrying the member 77 down with it by reason of the fact that the spring 80 engages the top 78 and the flange 79. The movement of the flange 79 downwardly brings the top 78 down below or underneath the hooks 82. In order to bring the top 78 below the hooks 82, it is necessary to lower the tube 72 an amount sufficient to place the spring 87 which bears against the lower side of the flange 76 under compression. Should the openings 83 in said top surface 78 be out of register with the hooks 82, so that said surface cannot pass to a point underneath the hooks, the pipe 72 is rotated through the medium of the gripping member or stop 75 until said openings 83 register with the hook ends 82, whereupon the downward movement may be continued. When the member 77 has been lowered sufficiently to carry the top 78 underneath the hooks 82, the pipe 72 is rotated to carry the unmutilated edge portion of said top underneath said hook ends whereupon the pipe 72 is released, and under the action of the spring 80 is raised into engagement with and to be held by the hooks. In this position of the parts, the spring 80 which is now under compression also urges the pipe 71 downwardly and thereby urges the cover 67 downwardly to seal the lower edge 68 thereof in the groove 69, thereby preventing entrance of water into the cup 51.

The horizontal flange 76 at the lower end of the tube 72 rides on one end of the spring 87, the other end of which bears against the cup shaped member 86, the side walls of which are perforated as at 85.

The hooked bi-metallic members 81 are preferably secured to the base 62 by the rivets 84 in such a manner that when said members 81 are sufficiently heated, they bend outwardly to remove and release the hooks 82 thereof from the surface 78. When this occurs, the spring 80 raises the member 77 to carry the top 78 upwardly. The compression spring 87 is also released because the flange 79 no longer can exert a downward stop action on the bead on tube 72 with which it cooperates and spring 87 will act to push the flange 76 upwardly whereby the bead on tube 72 which is integral with flange 76 pushes flange 79 upwardly. As flange 79 is integral with tube 71 to which the cover 67 is connected, the cover 67 will move upwardly whereby the edge 68, which is integral with cover 67 is raised from the groove 69 in the base permitting water in the compartment 66 to pass through the slits or perforations in the wall 63 to extract the coffee therewithin. The water with the coffee in solution then passes through the inner wall 64, and since the member 77 has been raised, under the lower edge of said member and through the openings 85 of the cup shaped member 86 and thence through the pipe 72 out through the top of said pipe and back into the water in the compartment 66.

The cup shaped member 86 is preferably in the form of a hollow cylinder closed at its bottom which is pressed by the compression spring downwardly relatively to the member 77 to maintain the bottom thereof in the groove 88. Consequently when the member 77 is in its lowermost position with its bottom edge held in the groove 88 under the action of the compression spring 87 no water can pass through the cup shaped member 86.

The thermostatic or bi-metallic members 81 are made of the proper metals and of the correct size to bend sufficiently to release the member 77 only after the coffee has been heated to the proper extent and for the proper time to properly roast the ground raw coffee inserted into the cup 51. When this has occurred, the water in the compartment 66 should have reached its boiling point. Regardless, however, how long the water in the compartment 66 has been boiling, no percolating action can take place until said thermostatic members 81 have released the member 77. Consequently, the roasting compartment remains adequately sealed against loss of the vapors therefrom by means of the cover 67 on the outside and top, the base 62 at the bottom and the members 77 and 78 at the central portion of the cup.

It will thus be seen that by means of the thermostatic members, the roasting time is adequately controlled and the time when percolation of the coffee in the cup 51 is begun, is also adequately controlled.

It will further be seen that I have provided an apparatus wherein the coffee is automatically percolated only after the roasting of the coffee has been completed and that I have provided a structure without rotating or other moving parts designed to be quickly and easily inserted into their operative positions and removed for cleaning purposes and, consequently, well designed to meet the severe requirements of practical use.

In the form of the invention shown in Fig. 5, the flange 19 of the cup 18 is screw-threaded to the cover 11 and is thereby removable from the pot with the cover as a unit, and is also removable from the cover for the insertion of ground coffee thereinto. The heaters 31 and 44 of Fig. 1 have here been omitted, however, and heat supplied to the water in the water compartment and to the cup 18 by means of a gas or other flame, or other suitable heating means. Flues as 90 open at their upper and lower ends are provided within the pot to conduct heated air or flame to the cup 18 from the heater (not shown).

It will be noted that regardless of the manner in which heat is supplied for roasting the coffee and for boiling the water, a sealed roasting compartment is provided to preserve the coffee aroma against loss, approximately uniform roasting is obtained without the use of moving parts, and percolation occurs in the roasting chamber without the necessity for conveying the roasted coffee elsewhere.

While I have shown and described certain specific embodiments of my invention, I do not wish to be understood as limiting myself thereto, but intend to claim the invention as broadly as may be permitted by the state of the prior art and the scope of the appended claims.

I claim:

1. In a coffee roasting and brewing apparatus, a water compartment, a cup for receiving a quantity of raw ground coffee adjacent said compartment, means within the cup providing a substantial heat-distributing area in the interior of the cup to aid in roasting the coffee which is out of contact with the walls of the cup, a tube communicating with the water compartment and with the cup, and heat responsive means for controlling the communication of said tube with said compartment.

2. In a coffee roasting and brewing apparatus, a pot including a water compartment, a heatable cup for receiving raw ground coffee and for roasting said coffee, heat-distributing means carried by the cup in the interior thereof, means carried by the pot for removably supporting the cup, a percolator tube communicating with the water compartment and with the cup, and a second tube surrounding the percolator tube and arranged to conduct coffee percolate from the cup to the water compartment.

3. A normally upright combined coffee roasting and brewing apparatus comprising a water container in the lower portion thereof adapted to be heated to boil the water therein, a normally stationary receptacle for green ground coffee within said apparatus located above said water container and out of contact with the water in said container, means for supplying heat to the green ground coffee over an extended area thereof, and means for passing water after it has been heated to coffee extraction temperature from said container through said stationary coffee receptacle to effect a coffee beverage.

4. A normally upright combined domestic coffee roasting and brewing apparatus, comprising a water container having a pouring spout open to atmosphere and adapted to be heated to boil the water therein, a normally stationary receptacle for green ground coffee associated therewith and out of contact with said water, said container and said receptacle being in relatively fixed position with respect to each other and with respect to said apparatus as a whole, means for supplying heat to the green ground coffee in said normally stationary receptacle over an extended area of said coffee, and means for passing water after it has been heated to a coffee extraction temperature from said container and through said stationary coffee receptacle to effect a coffee beverage.

5. In a coffee roasting and brewing apparatus, means forming a water compartment, means forming a sealed roasting compartment, means for unsealing said sealed roasting compartment comprising a heat responsive element whereby water from said water compartment may enter said roasting compartment after the roasting compartment has been heated to a predetermined extent.

6. A normally upright combined coffee roasting and brewing apparatus comprising a water container in the lower portion thereof adapted to be heated to boil the water therein, a receptacle for green ground coffee within said apparatus located above said water container and out of contact with the water in said container, means for supplying heat to the green ground coffee over an extended area thereof, and means for passing water after it has been heated to coffee extraction temperature from said container through said coffee receptacle to effect a coffee beverage.

7. A normally upright combined domestic coffee roasting and brewing apparatus, comprising a water container having a pouring spout open to atmosphere and adapted to be heated to boil the water therein, a receptacle for green ground coffee associated therewith and out of contact with said water, said container and said receptacle being in relatively fixed position with respect to each other and with respect to said apparatus as a whole, means for supplying heat to the green ground coffee over an extended area thereof, and means for passing water after it has been heated to a coffee extraction temperature from said container and through said coffee receptacle to effect a coffee beverage.

8. In a coffee roasting and brewing apparatus, a receptacle including a water compartment, a removable roaster unit located in said receptacle and comprising a cup adapted to receive raw ground coffee, means for heating the cup, a plurality of metallic elements distributed throughout the cup and presenting a comparatively large heating surface to the coffee therewithin, means for sealing the unit against the loss of coffee vapors, and means within said receptacle for percolating the water from said compartment through the coffee in the cup after the coffee has been roasted.

9. In a coffee roasting and brewing apparatus, walls forming a water compartment, a coffee roasting unit located adjacent but spaced from said water compartment, said roasting unit including a cup, means carried by the cup for distributing heat received by the cup and by said means throughout spaced parts of the interior of the cup, and means including a cover over said cup for sealing the roasting unit against the loss of vapors therefrom, and means for passing water from said water compartment into and through said cup for effecting a coffee brew.

10. In a coffee roasting and brewing apparatus, walls forming a water compartment, a roasting compartment including a movable member normally closing the roasting compartment from communication with said water compartment, spring means normally urging said member into a position wherein the roasting compartment is opened, and bimetallic means normally maintaining said movable member in its compartment closing position against the action of said spring means, said bimetallic means being responsive to heat and being movable thereby into a position to release said movable member whereby it may be acted upon by said spring means to communicate said water compartment with said roasting compartment.

11. In a coffee roasting and brewing apparatus, walls forming a water compartment, a cup for receiving raw ground coffee, heat distributing means in the interior of the cup, movable covering means for the cup, and heat responsive means for normally maintaining the covering means in its cup covering position and movable under the influence of heat to release said covering means and communicate said water compartment with said cup.

12. A normally stationary combined coffee roasting and brewing apparatus comprising walls forming a water container adapted to be heated to boil the water therein, a receptacle for green ground coffee within said walls and located in spaced relation and out of contact with the water in said container, means for supplying heat to the green ground coffee over an extended area thereof, and means for passing water after it has been heated to coffee extraction temperature from said container through said coffee receptacle to effect a coffee beverage.

GUSTAVE L. KAYDEN.